(12) United States Patent
Ville et al.

(10) Patent No.: US 7,358,899 B1
(45) Date of Patent: Apr. 15, 2008

(54) DISTANCE ESTIMATION IN A COMMUNICATION SYSTEM

(75) Inventors: Ruutu Ville, Espoo (FI); Timo Rantalainen, Helsinki (FI); Marko Alanen, Tempere (FI); Gudni Gunnarsson, Tempere (FI)

(73) Assignee: Nokia Corporation, Espoo (FI)

(*) Notice: Subject to any disclaimer, the term of this patent is extended or adjusted under 35 U.S.C. 154(b) by 1031 days.

(21) Appl. No.: 10/070,107

(22) PCT Filed: Aug. 31, 2000

(86) PCT No.: PCT/EP00/08551

§ 371 (c)(1),
(2), (4) Date: Jul. 23, 2002

(87) PCT Pub. No.: WO01/19112

PCT Pub. Date: Mar. 15, 2001

(51) Int. Cl.
*G01S 3/02* (2006.01)

(52) U.S. Cl. ..................... 342/458; 342/118
(58) Field of Classification Search ............... 342/118, 342/129, 133, 458; 459/450, 456.1, 456.2
See application file for complete search history.

(56) References Cited

U.S. PATENT DOCUMENTS 6,122,512 A * 9/2000 Bodin ................. 455/440

6,985,542 B1 * 1/2006 Nir et al. ................... 375/343

FOREIGN PATENT DOCUMENTS

| EP | 0 767 594 | 4/1997 |
|---|---|---|
| EP | 0 917 385 | 5/1999 |
| JP | 07-181242 | 7/1995 |
| JP | 08-079170 | 3/1996 |
| WO | WO 97/23785 | 7/1997 |
| WO | WO99/06851 | 2/1999 |
| WO | WO 99/27738 | 6/1999 |

* cited by examiner

*Primary Examiner*—Dao Phan
(74) *Attorney, Agent, or Firm*—Lackenbach Siegel LLP; Robert M. Bauer (57) ABSTRACT

The present invention relates to estimation of the distance between stations that communicate in a communication system over a radio interface. In the system at least one of the stations transmits signal bursts in time slots in accordance with a timing structure and at least one station receives the signal bursts. The method comprises determination of a first timing of a signal burst received at the receiving station, the first timing being associated with the first component of the received signal burst that meets a predefined condition. A second timing of the received signal burst is also determined for use in adjustment of internal timing of the receiving station for receiving and/or transmitting further signal bursts from and/or to the transmitting station. A timing offset is also determined between the stations. The distance between the stations is estimated based on the timing offset and the first timing of the received signal burst.

35 Claims, 4 Drawing Sheets

DISTANCE ESTIMATION IN A COMMUNICATION SYSTEM

FIELD OF THE INVENTION

The present invention relates to estimation of a distance between stations in a communication system, and in particular, but not exclusively, to use of at least one timing parameter in the distance estimation.

BACKGROUND OF THE INVENTION

A cellular communications system is based around cells or similar radio coverage areas. Examples of cellular telecommunications systems include standards such as, without limiting to these, GSM (Global System for Mobile communications) or various GSM based systems (such as GPRS: General Packet Radio Service), AMPS (American Mobile Phone System), DAMPS (Digital AMPS), CDMA (Code Division Multiple Access) or the proposed WCDMA (Wideband CDMA), or UMTS (Universal Mobile Telecommunications System) or other third generation communication system and so on. In general, a cell coverage area of a telecommunication system can be defined as a certain geographically limited area covered by one or several base transceiver stations (BTS) serving user equipment (UE) or mobile stations (MS) via an air or radio interface and usually connected to a base station subsystem (BSS). Several cells connected to each other cover a larger geographical area, and thus several cells form together a larger geographical area, and cellular telecommunication network.

Each coverage area of the system can be controlled by an appropriate controller apparatus. The controller can be connected further to a gateway or linking apparatus, such as a gateway GPRS support node (GGSN) or gateway mobile switching center (GSMC), linking the cell to the other communication networks, such as to a PSTN (Public Switched telecommunications Network) or to a data network, such as to a X.25 based network or to a TCP/IP (Transmission Control Protocol/Internet Protocol) based network.

The user equipment (UE) (that will be referred to in the following as mobile station or MS) within one of the cells of the telecommunications systems is respectively controlled by the controller functionality of the cell. The MS may be controlled by only one controller at time. However, the MS may also be simultaneously controlled by several controllers. This may occur e.g. when the cells overlap or in so called soft handoff mode, where the MS may be in communication with two base stations and those base stations may be connected to different controllers, or when one controller is controlling another controller controlling the MS. One controller can be defined as the serving (main) controller whereas the others act as secondary controllers.

The mobile station communicates with an appropriate network controller and provides the controller with various types of information. For instance, when the mobile station changes from one cell to a new cell or when the mobile station is switched on in one of the cells after having been switched off or unreachable for a while, the mobile station will send a message containing a MS identifier (ID) to the controller of the new cell. The controller of the new cell may be the same as in the previous cell or it may be different from the previous controller handling the MS before the cell change. The MS ID comprises data required by the telecommunications system in order to be able to handle the incoming/outgoing call and signalling to/from the MS, respectively. Once the MS ID is received by the system, the system is aware of the current cell of the particular mobile station.

In time division multiple access (TDMA) networks, a plurality of time slots is used for the transmission between the mobile stations and the base transceiver stations. A frame is made up of a predetermined number of time slots. Each mobile station will be allocated a given time slot in each frame in which to communicate with a base transceiver station. In order to process correctly the signal received from various mobile stations, the signal from each mobile station must be received within its allocated time slot at the base station. To ensure that the signals are received within the allocated time slots the base station will provide the mobile station with timing advance (TA) information. The timing advance information indicates when the mobile station should transmit its signal to the base station. The timing advance information is required since propagation of radio waves between the transmitting and receiving stations causes a delay in the transmission between the stations. In other words, the travel of the radio waves from the BTS to the MS and vice versa takes some time, and thus there is a certain offset between the timings of the slots used by the MS and the BTS. In order to address the delay, and more precisely, to avoid any overlapping time slots, it is therefore necessary to determine the time delay between the mobile station and the serving base transceiver station.

According to an approach a mobile station in an idle mode adjusts its internal timing according to bursts received from the serving base station. When the MS transmits for the first time to the BTS (access bursts), this is done by using the internal timing of the mobile station which is delayed compared to BTS's timing. When the BTS receives these signals, it measures the time offset between its frame structure and the received MS bursts. The difference between these two timings equals to the propagation delay of the radio waves travelling from the BTS to the MS and back, i.e. twice the distance between the stations. To avoid overlapping time slots in the BTS, the BTS provides the MS with timing advance (TA) value information indicating the time how much earlier the MS should transmit towards the BTS. By means of this it is possible for the MS to adjust its transmission so that the transmission can be received by the BTS in slots according to the frame structure used by the receiving BTS. During a dedicated connection the BTS continuously determines the appropriate TA value and signals the TA value to the MS.

Figure 3:
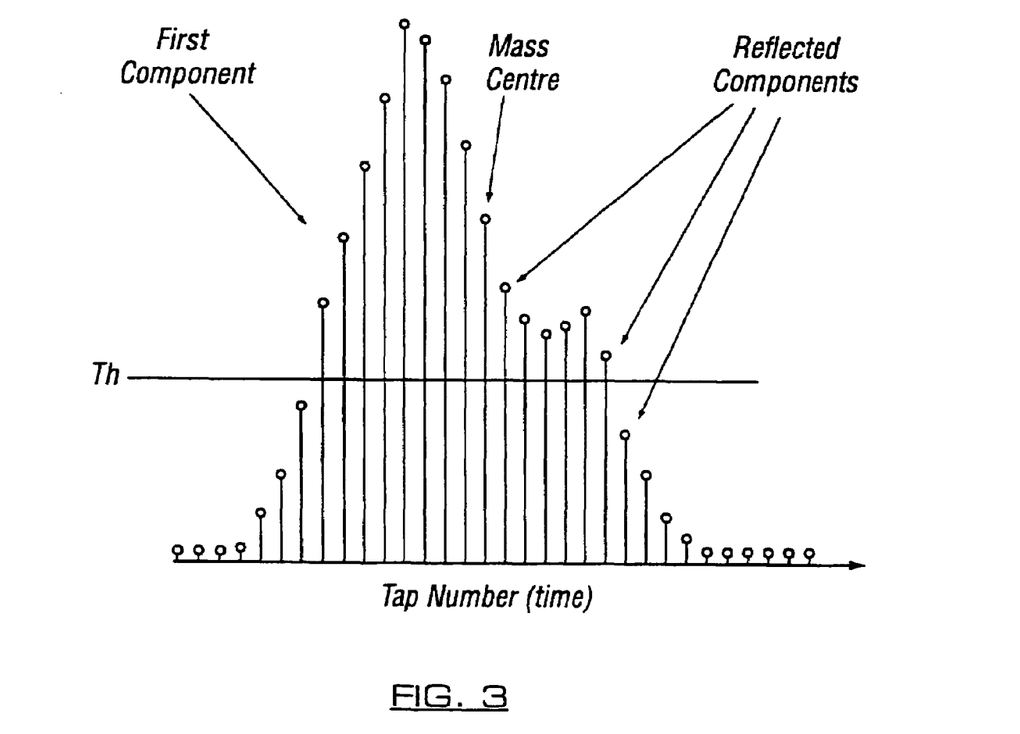
FIG. 3 shows an impulse response.

One possible way to determine the timing is based on impulse responses. The impulses response can be obtained by correlating a known bit pattern in a burst (a so called training sequence) with the received signal. The impulse response is a curve with the time on X-axis (component taps) and intensity on the Y-axis (see FIG. 3 showing an exemplifying impulse response). For normal operation of a TDMA system, such as the GSM, it is important that the reception is adjusted so that a maximum energy will be received. Thus the timing has been determined in the prior art from the mass center of the impulse response.

The functionalities of the cellular communication system facilitate a provision of an at least rough location estimate concerning the current location of an individual mobile station. More particularly, the cellular communication system is always aware (at least roughly) of the current location area of such mobile stations which are communicating with at least one of the base stations of the system. This information is available even when the mobile station is located within a coverage area of a visited or "foreign" network, as the visited network is capable of transmitting the location information of the mobile station back to the home network, e.g. for the purposes of routing and charging.

A location service feature provided by means of a cellular telecommunications network has been proposed. The proposed location service can provide the last known location of a mobile station together with a time-stamp. The proposed service functionality can be provided by a separate network element or server which receives the information from the various controllers of the system.

One possibility of making the location determination more accurate is to utilize the timing delay or offset information between a mobile station and a base station. This is based on the realization that when the mobile station is relatively far from the base station, the signal will travel for a longer time to the base station as compared to when the mobile station is relatively close to the base station. Therefore, in order to address the offset, a mobile station relatively far from the base station will have to send its signal to the base station more "in advance" relative to the timing structure than a mobile station which is relatively close to the base station. The timing advance information (TA) is thus also a measure of the distance between the mobile station and the base station. The timing advance information does not provide indication as to the direction from which the signal has been received. Thus the use of the timing advance information may require use of some other supporting information so that the direction can be estimated. For instance, the location may be accomplished such that the mobile station communicates also with at least one other and preferably with three neighboring base stations covering the area in which the mobile station is currently located in the event that no other indication of the direction is available. Directional antennae or Angle of Arrival (AOA) measurement from one base station site may also be used together with the timing advance information. In the latter case the location is determined to the intersection of AOA line and timing advance circle.

Currently the timing advance is determined e.g. in the GSM system with an accuracy of 1 bit. This corresponds to 3.69 μs in time and 1.1 km in distance. This accuracy is enough for the normal operation of the cellular communication system. However, it may not be enough for some special purposes, like for estimating a distance between two or several stations of the communication system and for geographically locating a mobile station based on the timing advance information.

SUMMARY OF THE INVENTION

It is an aim of the embodiments of the present invention to address one or several of the above problems.

According to one aspect of the present invention, there is provided a method for estimating a distance between stations communicating in a communication system over a radio interface, wherein at least one of the stations transmits signal bursts in time slots in accordance with a timing structure and at least one station receives the signal bursts, said method comprising the steps: determining a first timing of a signal burst received at the receiving station, the first timing being associated with the first component of the received signal burst that meets a predefined condition; determining a second timing of the received signal burst for use in adjustment of internal timing of the receiving station for receiving and/or transmitting further signal bursts from and/or to the transmitting station; determining a timing offset between the stations; and estimating the distance between the stations based on the timing offset and by utilizing the first timing of the received signal burst.

In a preferred embodiment the step of estimating the distance comprises determining a difference between the first timing and the second timing and correcting an estimate of the distance between the stations based on the determined difference. A timing advance value based on the offset may be used in said estimation of the distance, wherein a difference between the first timing and the second timing is determined and the difference between the first timing and the second timing is subtracted from the timing advance value.

According to one possibility the receiving station may use different reception and transmission timings, wherein the reception timing of the receiving station is adjusted in accordance with the determined second timing and the transmission timing for transmitting a response signal from the receiving station to the transmitting station is adjusted in accordance with the determined first timing. The transmitting station may determine a timing of a received response signal such that the timing is based on a component of the received response signal corresponding to said first component, whereafter a difference between the transmission timing and the timing of the received response signal is determined.

One of the stations may be a mobile station of a cellular communication system and at least one of the stations may be a fixedly positioned base station. The current geographical location of the mobile station may be determined by means of the estimated distance between the mobile station and said at least one base station. Information of at least one of the determinations may be communicated to a location service node of the communication system.

According to another aspect of the present invention there is provided a communication system comprising: a transmitting station arranged to transmit signal bursts over time slots in accordance with a timing structure of the communication system; a receiving station arranged to receive the signal bursts; control means for determining a first timing of a signal burst received at the receiving station, the first timing being associated with the first component of the received signal that meets a predefined condition; control means for determining a second timing of the received signal bursts for use in adjustment of the receiving station for receiving and/or transmitting further signal bursts; control means for determining a timing offset between the transmitting station and the receiving station; and control means for estimating a distance between the stations based on the timing offset and the first timing.

Embodiments of the invention may provide several advantages. The accuracy of the distance estimation between the mobile station and the serving base station is improved, which leads to improved location accuracy, as the timing information used for the distance calculations is corrected by information concerning the timing for the shortest path for radio propagation. The timing information is already used by the communication systems and therefore some embodiments of the invention do not require any changes to the existing mobile stations. In addition, some embodiments of the invention do not require any hardware changes to the existing mobile stations or the base stations. The provided accuracy enables embodiments where only one base station is needed for providing the geographical location of a mobile station.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
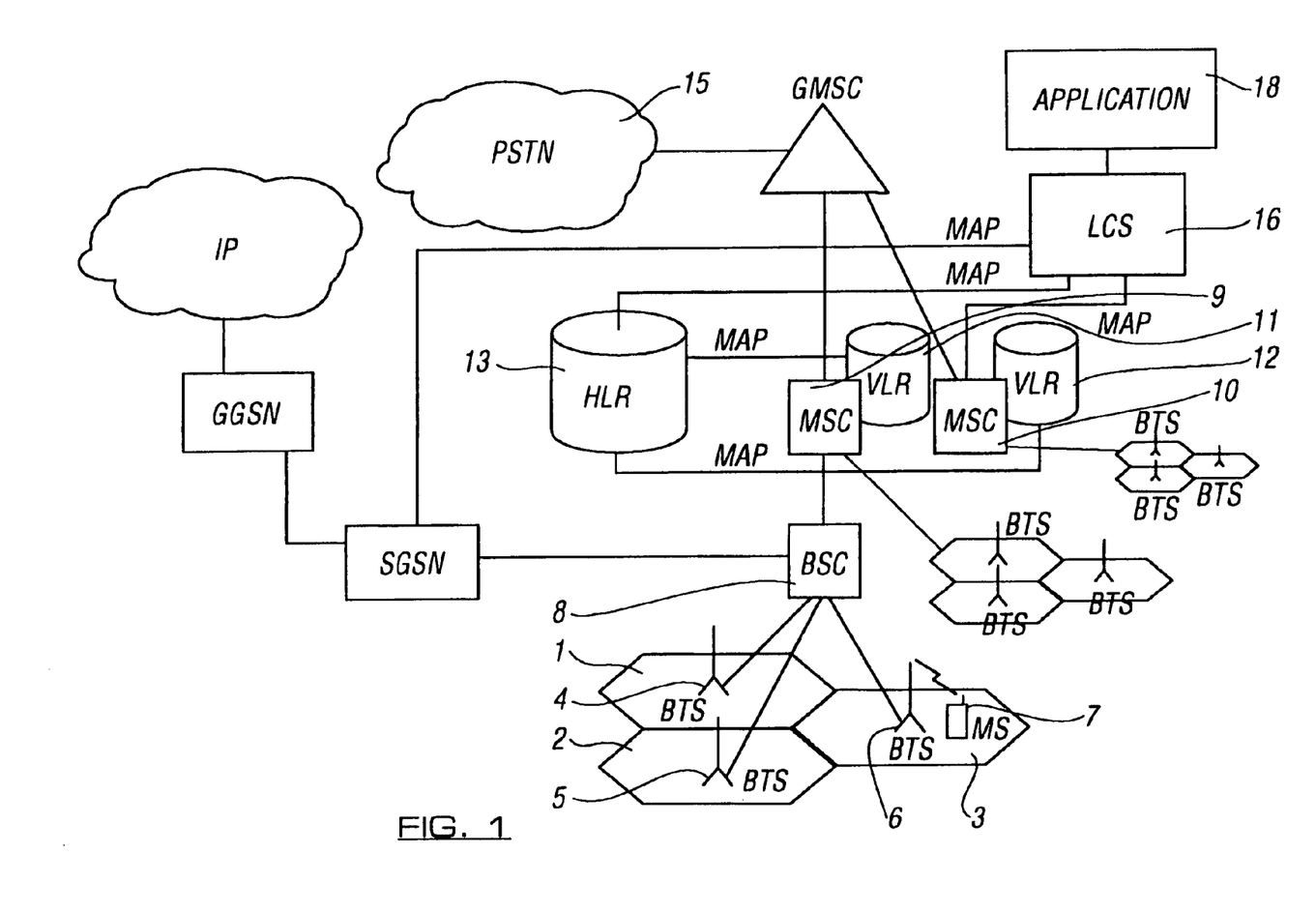
FIG. 1 shows one possible network environment in which an embodiment of the present invention may be implemented.

Reference will first be made in FIG. 1 illustrating a general view of one possible cellular telecommunications system having a location service. It is noted that even though the exemplifying telecommunications network shown and described in more detail in the following uses the terminology of a circuit switched GSM (Global System for Mobile communications) public land mobile network (PLMN), the proposed solution may be used in any communication system providing some degree of location functionality for at least one of stations communication with the system using time slots. It should also be appreciated that even though FIG. 1 shows three base station groups which each provide three omnidirectional radio coverage areas 1, 2 and 3, the embodiments of the invention may be implemented using any number of radio coverage areas. The coverage areas 1, 2 and 3 may also be, instead of base station coverage areas, three cell coverage areas of the mobile communications network, where the coverage area of one cell includes more than one base station. It is also possible to group several cells such that one coverage area comprises more than one cell. For example, URA (UMTS Terrestrial Radio Access Network Registration Area) in the UMTS standard consist of a group of cells. It is also noted that the radio coverage area may consist of a sector of a base station provided with a directional or sector antenna (not shown). The sector base station may use e.g. three 120° directional antennas whereby three radio coverage areas are provided, or four 90° directional antennas providing four radio coverage areas and so on, or any combinations of different radio coverage beam widths. It should also be appreciated that base stations may sometimes be referred to as node B (e.g. in the UMTS standard).

In FIG. 1 each radio coverage area 1, 2 and 3 is served by the respective base transceiver station (BTS) 4, 5 and 6. Each base transceiver station BTS is arranged to transmit signals to and receive signals from the mobile station (MS) 7 in the cell. Likewise, the mobile station 7 is able to transmit signals to and receive signals from the respective base transceiver station. The mobile station 7 accomplishes this via wireless or radio communication with the base stations. Typically a number of mobile stations will be in communication with each base station although only one mobile station is shown in FIG. 1 for clarity.

Each of the base stations is connected to a respective network controller, which in one form of the exemplifying GSM system comprises a base station controller 8 connected further to a Mobile Switching Center (MSC) 9. However, as is also shown by FIG. 1, in some arrangements the base station controller 8 controlling one or several base stations between the network controller and the base stations may be omitted. Each of the network controllers controls its service area, i.e. the cells and base stations connected to it, either directly or via the base station controller. It is noted that more than one base station or base station group may be connected to each network controller. Typically more than two network controllers are also provided in a network. The network controllers is connected to other elements or parts of the telecommunications network system via a suitable linking or gateway apparatus, such as Gateway Mobile Switching Center (GMSC) 14.

The implementation of the communication between the mobile station and the controller is known, and will thus not be discussed in more detail herein. It is sufficient to note that the interface may comprise channels in both uplink and downlink directions between the mobile station in the cell associated with a given base station and that the information sent to the mobile station and the data sent from the mobile station may be in packet form (e.g. in the GPRS or UMTS systems). However, other formats for transmitting information are not excluded and in alternative embodiments of the invention. The data may thus be sent in any suitable format. The messages sent from the mobile stations may include information identifying the mobile station (for instance, MS ID and/or IMSI (Mobile Station Identity and/or International Mobile Subscriber Identity, respectively)).

FIG. 1 also illustrates the possibility of using a packet switched mobile telecommunications service for communication with a data network. The illustrated GPRS (General Packet Radio Service) is based on the GSM technology and it may use the existing GSM base stations and other network elements for its operation. The GPRS comprises a serving GPRS support node (SGSN) corresponding substantially to the MSC of the GSM networks for controlling the service area and a gateway GPRS support node (GGSN) for interfacing with the data network, for example the TCP/IP (Transport Control Protocol/Internet Protocol) Internet. In the GPRS system the network controller SGSN is arranged to pass on data packets to be transmitted to the mobile station 7 by the respective base station. The controller will also receive from the base station packets of data which is has received from the mobile station.

The mobile station 7 is able to move within a radio coverage area and also from one radio coverage area to another coverage area, e.g. from cell 1 to cell 2. The location of the mobile station 7 may thus vary in time. To ensure proper operation of the system and to avoid disconnecting a possibly ongoing call, handover procedures which are known are provided so that all necessary information will become available for the parties involved (e.g. for the previous and new network controller). The mobile station may also be in communication with more than one base station, e.g. during a so called soft handoff procedure. The roaming mobile station 7 communicating with different base stations of the communications system may be registered to a home location register (HLR) 13 and also to a visitor location register (VLR) 11. It is noted that a mobile telecommunications network may include several home location registers and that the home location registers may be included in one or several of the network controllers.

FIG. 1 shows also a Location Services (LCS) node 16 providing location services for different applications or clients 18 who are entitled to receive at least some degree of information concerning the geographical location (or location history) of a mobile station. The clients may be external, i.e. clients from outside the communication system. The clients may also be internal, i.e. functionalities or elements of the communication system itself may use geographical location information provided by the LCS node 16 for the operation of the system (for instance, resource allocation, location assisted handover, fleet management or location related billing). A more detailed proposal for a location service functionality can be found from ETSI (European telecommunications Standards Institute) technical specification GSM 03.71. In general terms, the LCS functionality can be defined as a feature capable of providing information concerning the geographical location of a particular mobile station. The geographical location of the mobile station may be defined on the basis of the position of the mobile station relative to the base station(s) of the mobile telecommunications system. The location server node 16 is arranged to receive predefined data concerning the geographical location of the mobile station 7 and to process this data and/or some other predefined parameters and/or to compute appropriate calculations for determining and outputting the geographical location of the given mobile station. The location server 16 may also be arranged to check the client's 18 right to receive any information therefrom.

The location server 16 has a communication connection with one or several of the elements of the communication system, such as the home location register 13, the visitor location register 11, 12, the MSCs 9 and 10 or the BSC 8. The communication connection may be implemented e.g. by means of a MAP (Mobile Application Part) connection. It is noted that even though the LCS node 16 is shown in FIG. 1 as a stand-alone element, it could also be integrated in an appropriate network element, e.g. be an internal component or a functionality of any of the controllers 8, 9, 10 or gateways of the communication system.

The location information may be transmitted from the communication network to the location server 16 in response to a request by the location server. The location server 16 may also receive location information updates periodically from the communication network. The network may also provide the location server automatically with updated location information in the event that the location of the mobile station changes. The location information may be provided with a timestamp. The timestamp is attached to the data e.g. by the visitor location register or the home location register and indicates the time the location data was provided.

The determination of the location of a mobile station may be based on measurements of at least one feature of the components of a radio signal from which it is possible to determine the distance between the transmitting station and the receiving station. In a TDMA system a feature which may be used for this is the timing of the components in a time slot, as will be explained in more detail later in this specification.

It is noted that the distance measurements may be accomplished in the uplink and/or in the downlink, i.e. at the base station end or at the mobile station end or both. In the case where the mobile station is used for the determining at least a part of the information used for location estimation purposes, it may use the radio network for messaging the results to an appropriate network element. The necessary location calculations and determinations based on various collected/defined data may be accomplished at the base station and/or the mobile station or then at an appropriate network element having an access to all required data.

Figure 2:
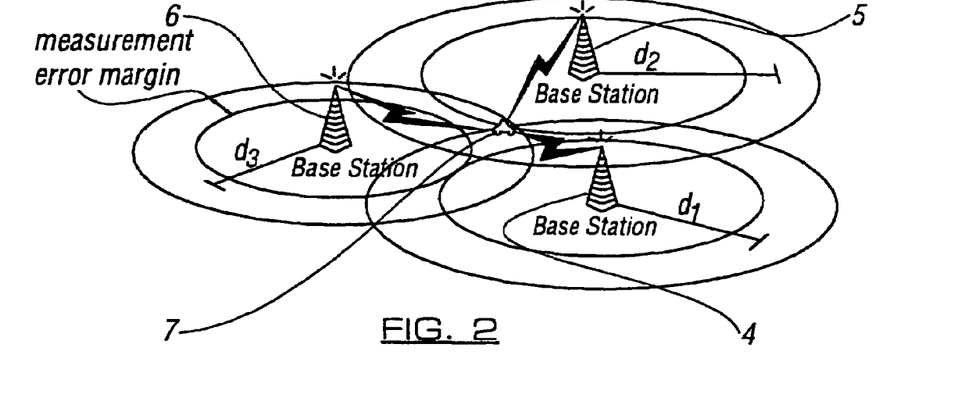
FIG. 2 shows an embodiment using three base stations for location a mobile stations.

FIG. 2 illustrates a situation in which the geographical location of a mobile station 7 is estimated by using three base stations 5, 6 and 7. The distance between the mobile station (MS) 7 and each of the three base stations may be estimated using timing advance (TA) information. In theory this provides three circles that are in most cases enough to find an accurate enough estimate for the location of the MS 7, the geographical location being the intersection point of the three circles. In the absence of any measurement error, the intersection of the three circles in the FIG. 2 would then unambiguously determine the accurate location of the mobile station 7.

However, as may also be seen from FIG. 2, in practice the situation will not be this straightforward due to various measurement errors, such as the already mentioned insufficient accuracy of the timing advance information for the distance measurement purposes and/or blocking elements or obstacles in the radio propagation path (Non Line of Sight (NLOS) conditions). The obstacles could be, for example, buildings and other large constructions, pillars, statues, trees, rocks, cars or similar elements between the base station and the mobile station. The amount of measurement error depends also on the actual distance between the transmitting station and the receiving station. In multipath connections the possibility for determination errors increases further.

It is noted that the three base stations of FIG. 2 are an example only and that when implementing the embodiments of the invention the number of base stations may be different from this example. The improved accuracy provided by using timing information in accordance with the following embodiment enable even the use of a single base station for the location purposes. The timing advance (TA) measurement may be also be used together with an angle of arrival (AOA) measurement from only one BTS site. In this case the location may be determined to the intersection of AOA line and a timing advance (TA) circle. A possibility is to use the timing advance information together with a sector antenna referred to above. Other known methods, such as observed time difference (OTD) and time difference of arrival (TDOA) may also be used together with the timing advance information.

As explained earlier in this specification, a timing advance information parameter or value is used in time division multiple access (TDMA) networks, such as the GSM, in order to be able to separate the time slots in a frame from each other. The timing advance information is required since propagation of radio waves between the transmitting and receiving stations causes a delay in the transmission between the stations. In brief, the timing advance (TA) information indicates how much earlier the MS should transmit towards the BTS so that the transmission would be received by the BTS according to the frame structures used by said receiving BTS. During a dedicated connection the BTS continuously determines the appropriate TA value and signals the TA value to the MS. In order to address the delay, and more precisely, to avoid any overlapping time slots, it is therefore necessary to determine the time delay between the mobile station and the serving base transceiver station (BTS) in order to be able to generate the timing advance (TA) information describing the offset between the timings used by the respective stations. The TA parameter may be achieved by defining the timing of a component of a received signal burst and comparing the timing of that component to the timing of the same component in a training sequence.

FIG. 3 shows an impulse response pattern for a received signal burst which relates to one possibility for determining the timing based on impulse responses. The impulse response can be obtained by correlating a known bit pattern in a burst (a training sequence) with the received signal. The impulse response shown by FIG. 3 is a curve with the time on X-axis (components taps) and intensity of the signal on the Y-axis. The first four or five components (taps on the left) show substantially low or almost nonexistent response or correlation with the training sequence. After these the response starts to increase, and the two highest components indicate of an almost full response.

FIG. 3 shows arrows pointing to three different types of components (taps) of the response: a first component, a mass center component and reflected components. In the normal operation of a communication system it is important that the timings of the transmitting and receiving stations are adjusted so that a maximum energy will be received at the receiving station. The timing for the actual transmission has been conventionally determined from the mass center of the impulse response, as this has been found to provide appropriate energy levels, although the adjustment of the timing for transmission and/or receiving purposes may also be based on some other approach, such as amplitude or power of the received signal.

However, a timing providing a best energy may not be the best timing for use in distance estimation procedures. As can be seen from the FIG. 3, the mass center can be positioned relatively far on the right on the X-axis, as it is a weighted value considering the entire burst taking also all reflected components into account. In the event of a multipath propagation the impulse response curve becomes even wider as the reflected signals make the impulse response asymmetric by moving the intensity to the right in FIG. 3. In other words, the mass center components do not take the LOS and NLOS conditions into account. For the purposes of location it would, however, be advantageous to use a component which indicates the shortest path between the mobile station and the base station. This component will in the following be referred to as the first component.

In brief, the first component is the first component of the arriving signal that meets a predefined condition or several conditions. According to one possibility the first component can be defined as a first arriving component on the rising edge of the impulse response curve. The first component may also be a first component at the mass center of a first peak. The predefined condition is preferably set such that the first component of the received signal burst is the first arriving component that can be detected in a sufficiently reliable manner. The first reliably detected component arrives as a first recognizable component of the transmission, and thus it must have traveled the shortest path from the transmitter. In an ideal occasion the first component represents a line of sight (LOS) situation without being distorted by any reflections.

In FIG. 3 the condition for the first component is defined by a threshold level Th. The threshold level is defined such that the first component exceeding it is the first component giving reliable enough results for the timing measurements for the location purposes. It is also possible to use some other conditions for defining the first component of the received signal burst. These include, without limiting to these, a tap in the first peak with maximum height (in case the response includes several peaks), the first tap with height more than a predefined portion of the height of the highest tap (e.g. 40%), the first tap in the first peak with height more than a predefined portion of the height of the first peak (e.g. 40%), a tap corresponding to the maximum derivative of the first (main) rising slope (the fastest rise), the first tap with the height exceeding the signal to noise ration by a predefined amount (e.g. 1.5 times S/N) and so on. If an impulse response has more than one peak, the first peak can be found, for example, by sliding a suitable window over taps, and monitoring the total sum of the heights of the taps. When this sum has the first maximum, the first component (tap) is found. Another way is to trace the derivative of tap heights. The first crossing through zero indicates the first peak.

The following embodiments discuss in more detail the possibilities to improve the accuracy of distance estimations based on the timing information. In the following examples it is supposed that timings are determined using impulse responses. However, it is to be appreciated that also other solutions for defining the timing of the components of a signal can be used when implementing the invention. Examples of such alternatives include monitoring of signal amplitudes or power levels.

Figure 4A:
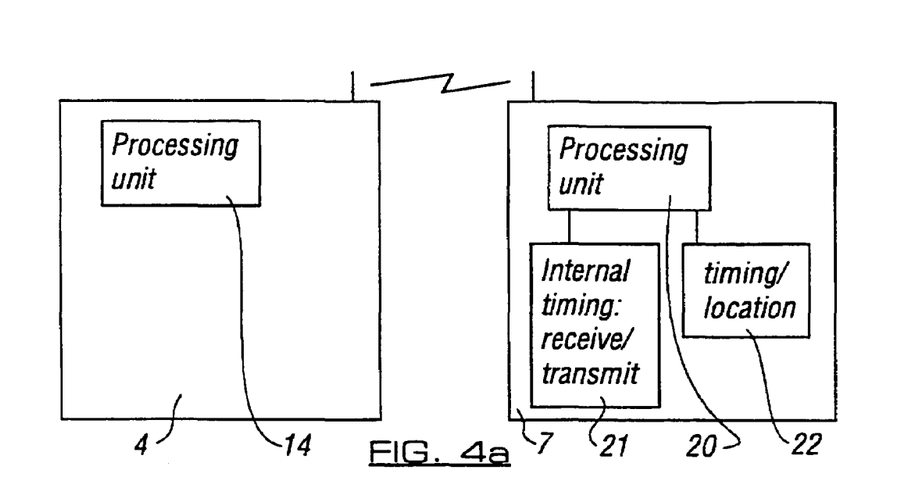
FIGS. 4A, 4B and 4C show block diagrams for possible embodiments.
Figure 4B:
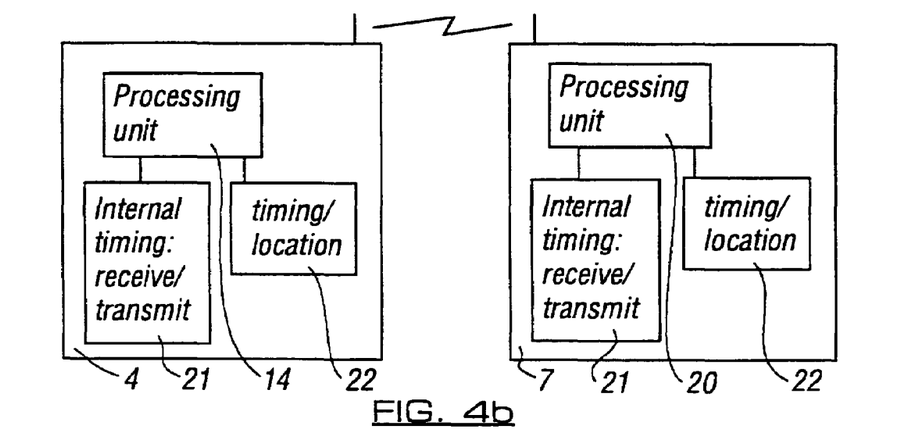
Figure 4C:
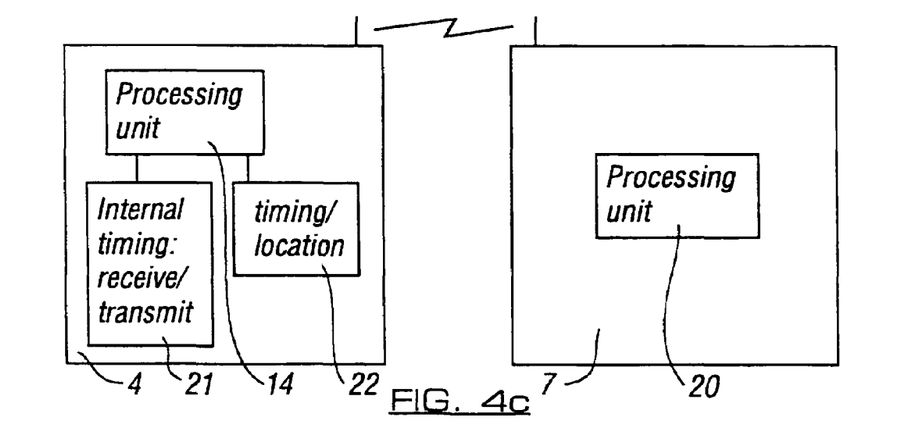
Figure 5:
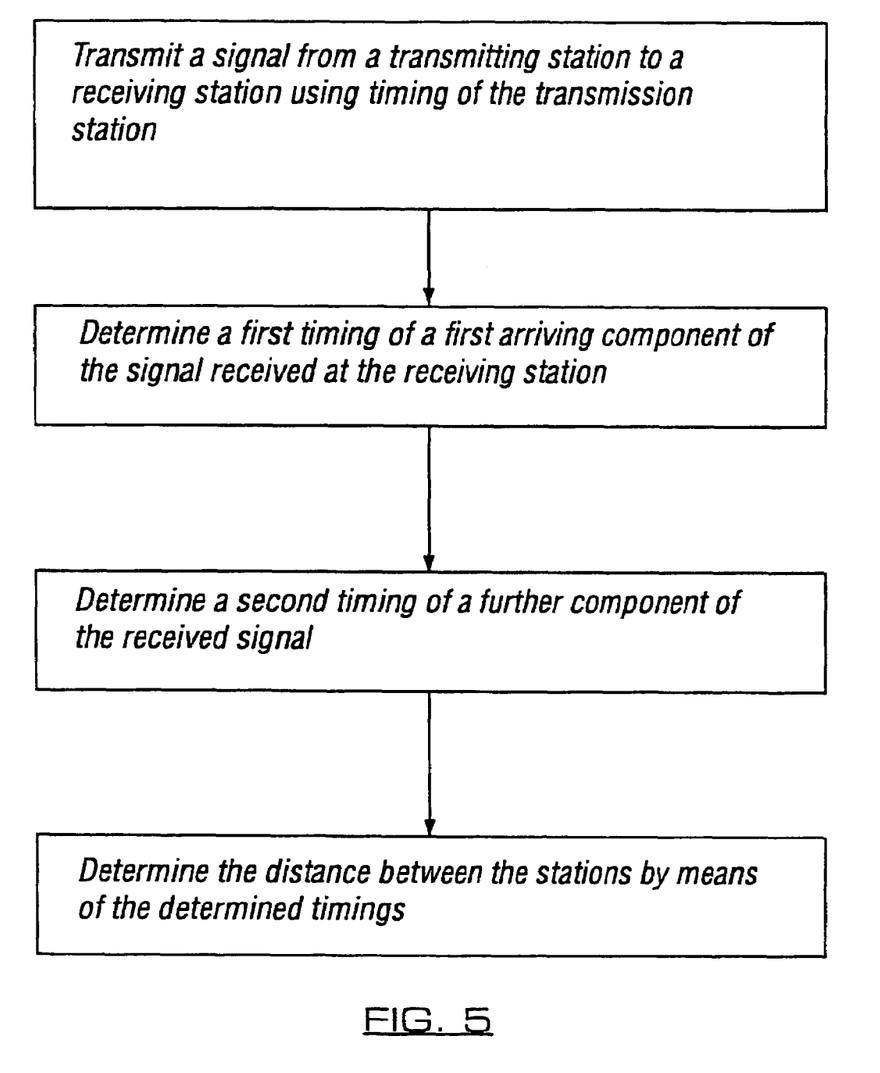
FIG. 5 is a flowchart illustrating the operation of an embodiment of the present invention.

The block diagrams of FIGS. 4A to 4C illustrates some possibilities for the embodiments of a base station and a mobile station pair. In these embodiments it is assumed that the operation is initiated by the base station 4. It is noted that the first transmission in a operation cycle in accordance with the embodiments can also be transmitted by the mobile station 7.

In the first embodiment disclosed by FIG. 4A a base station BTS 4 transmits signal bursts by its internal timing structure in a per se known manner. The signal may include an indication that a timing information is required for location purposes. A mobile station 7 is arranged to receive the signal bursts from the BTS and to adjust its internal reception timing 21 according to the received bursts in a conventional manner in order to optimize the timing for the communication. The adjusting is accomplished by a processing unit 20. In our example this can be done using the mass center of the impulse response of FIG. 3.

In addition to determining the mass center and the timing of the mass center, a first component of the signal that meets a predefined condition is detected at the receiving mobile station 7. After detection, a timing 22 of the first arriving signal component is determined by the unit 20 for use in determining the distance between the stations. In the impulse response the first arriving signal component can be, for example, first one of the taps in the rising (left) edge exceeding threshold value Th of FIG. 3. It may also be the mass center of the first peak, if the first peak can be separated. In most cases the first component is more relevant for the location purposes than the mass center or any later component, since it represents the signal coming as directly as possible from the BTS 4 to the MS 7 (shortest path) under Line of Sight (LOS) conditions, or at least the signal traveling the shortest reflected path under Non Line of Sight (NLOS) conditions.

According to an embodiment the mobile station 7 responds to the received signal burst by transmitting a response back to the BTS 4 by using a different timing from that of the internal (reception) timing 21. In other words, the timing 22 used for responding is different from the single timing 21 the MS 7 would use in a conventional mode of operation for receiving and also for transmitting. The necessary processing for this can be accomplished at a processor unit 20 of the MS 7 of FIG. 4A. The timing of the response transmission is based on the timing 22 of the first signal component in the impulse response instead of the timing of the mass center component 21. The BTS 4 receives the signals from the MS and determines the impulse response. The base station 4 uses the taps of the trailing sequence corresponding the first component instead of the taps of the mass center to determine a timing advance (TA) for the connection. Therefore the timing advance (i.e. the propagation delay) information generated for use in location, e.g. by the location server 16 of FIG. 1, will be correspondingly based on the first component of the transmission. The first component is believed to give more accurate results for the distance estimation than the mass center component, as the mass center component is affected by the reflected signals. After the location procedure is over, it is preferred that the system returns to normal mode of operation and use the normal timing parameters for further communication between the base station and the mobile station. However, this is not necessary in all instances.

It is possible that the mobile station 7 cannot use the different reception and transmission time bases 21 and 22 of FIG. 4A. However, it is possible that the MS 7 adjusts its internal time base 21 as usual, e.g. using the mass center, and only measures the difference between the first component and the mass center. The difference can be a time difference between the components, the difference between the order numbers of the components or the bits of the burst. The determined difference is subsequently reported to the communication network to be used as a correction value in the subsequent timing based distance determinations. The correction calculations of the timing advance for use in the distance estimation can then be accomplished at the base station 4 or in any other appropriate network element. The advantage of this embodiment is that all transmission will be sent by using the optimized timing. e.g. the mass center, instead of using the first component based timing for e.g. the access bursts.

FIG. 4B shows an embodiment in which both the mobile station 7 and the base station 7 are provided with internal and location timing functionalities 21 and 22. This enables a determination of the timing of the first arriving component in both the transmitting base station 4 and the receiving/transmitting mobile station 7 and thus a determination of the distance between the station can be based on the timing information by the base station or the mobile station or both.

The above described embodiments require some modifications to the hardware and/or software of the existing mobile stations. Because a number of "old" mobile stations cannot perform all parts of the above described functionality, it may be preferred in some instances that a mobile station capable of performing the above procedure indicates to the network that it has used the different reception and transmission time bases 21 and 22. By means of this the network is enabled to make a decision whether to apply any corrections to the timing advance values or not. In addition, by means of this information the network may initiate a routing procedure in order to deliver the timing information to the location service for use in the distance estimation calculations.

Compared to the present systems, the above procedures eliminate a double error (both in MS and BTS) caused by reflections in the radio propagation path. This error can be hundreds of meters.

The following will describe embodiments which do not necessarily require any changes to the existing mobile stations. A BTS 4 of FIG. 4C transmits in a usual manner by its internal 21 timing towards a MS 7. The MS 6 receives the first signal burst from the BTS 4 and adjusts its internal timing at the processing unit 20 in accordance with the received burst(s) as usual, e.g. using the mass center of an impulse response between the received signal and a known bit pattern. The mobile station 7 subsequently transmits a response back to the base station 4 using the internal timing based on the determined mass center of the impulse response.

The BTS 4 receives the response signals from the MS 7 and determines the impulse response. A processing unit 14 of the BTS determines two separate timings 21 and 22: currently used timing based on the mass center and the timing based on the first component. Thereafter the BTS 4 determines the time difference between these two timings. The BTS measures also the timing advance (TA) based on the first component. To compensate an error made by the MS, the BTS subtracts from the measured timing advance (TA) the determined time difference between first component and mass center (based on its own measurements). This is based on the assumption that the radio channel is unchanged between uplink and downlink bursts and symmetric. In addition, the MS is assumed to use the mass center of a similar component in a similar manner to the base station. In practice this means that the effects of multipaths on the impulse response, and thus the difference between the mass center and the first component, is similar both in the BTS and in the MS.

The largest benefit of the timing advance (TA) location method of FIG. 4C is that also old (unmodified) mobile stations can be located. A common view has been that the use of old mobile stations lead to poor accuracy, but the above embodiment enables a good accuracy also with old mobile stations.

The location information provided by the communication system can also be used for purposes other than call processing such as for routing, charging, resources allocation and so on. There are several possible commercial and non-commercial applications which may use this location information. These possible applications include, without limiting to these: different local advertisement and information distribution schemes e.g. transmission of information directed to those mobile users only who are currently within a certain area; area related WWW-pages such as time tables, local restaurant, shop or hotel guides, maps, local advertisements and so on; location of those who have called to an emergency number; and tracking of mobile users by anyone who wishes to receive this information and is legally entitled to obtain it. An application requiring precise and real-time location information of the movement of a mobile station is a mobile station movement prediction feature that may be utilized, for example, in dynamic network resource allocation. There are various other possible uses of the location information and applications which may use the location information. In general, all applications which need geographical location of the mobile station may find the location information provided and/or processed by means of a telecommunication system useful. The usability of this location information is increased by improving the accuracy of the location information provided by the telecommunications system by the above discussed embodiments.

It should be appreciated that whilst embodiments of the present invention have been described in relation to mobile stations, embodiments of the present invention are applicable to any other suitable type of user equipment.

It is also noted herein that while the above describes exemplifying embodiments of the invention, there are several variations and modifications which may be made to the disclosed solution without departing from the scope of the present invention as defined in the appended claims.

The invention claimed is:

1. A method:
   determining a first timing of a signal burst received from a transmitting station at a receiving station, the first timing being associated with a first component of the received signal burst that meets a predefined condition;

determining a second timing of the received signal burst, said second timing being for use in adjustment of internal timing of the receiving station for communicating further signal bursts with the transmitting station;

determining timing delay information for the communication between the transmitting and receiving stations; and estimating a distance between the transmitting and receiving stations based on said timing delay information and information about the first timing of the received signal burst.

2. A method according to claim 1, comprising determining a difference between the first timing and the second timing, wherein the determined difference is used as a correction value in the estimation of the distance between the stations.

3. A method according to claim 1, wherein a timing advance value that is based on the timing delay information is used in said estimation of the distance, comprising:

determining a difference between the first timing and the second timing; and subtracting the difference between the first timing and the second timing from the timing device value.

4. A method according to claim 1, wherein the respective timings are determined using an impulse response of the received signal burst.

5. A method according to claim 4, wherein the determination of the second timing is based on the mass center of the impulse response.

6. A method according to claim 2, wherein the receiving station determines the difference between the first timing and the second timing and the first and second timings are determined using an impulse response of the received signal burst.

7. A method according to claim 6, comprising transmitting the determined difference between the first timing and the second timing to the transmitting station for processing.

8. A method according to claim 1, comprising:

use of different reception and transmission timings at the receiving station, wherein the reception timing of the receiving station is adjusted in accordance with the determined second timing and the transmission timing for transmitting a response signal from the receiving station to the transmitting station is adjusted in accordance with the determined first timing;

receiving the response signal at the transmitting station;

determining at the transmitting station a timing of the received response signal such that the timing is based on a component of the received response signal corresponding said first component; and determining a difference between the transmission timing and the timing of the received response signal.

9. A method according to claim 8, wherein the receiving station informs the communication system that it uses different reception and transmission timings.

10. A method according to claim 1, wherein the receiving station comprises a mobile station of a cellular communication system and the transmitting station comprises a base station of the cellular communication system.

11. A method according to claim 1, wherein the receiving station comprises a base station of a cellular communication system and the transmitting station comprises a mobile station of the cellular communication system.

12. A method according to claim 11, wherein the difference between the timings is subtracted from the timing advance by the base station.

13. A method according to claim 1, wherein the predefined condition is met by the signal component of the signal burst that arrives as a first detectable component of the transmission.

14. A method according to claim 1, wherein the predefined condition comprises a threshold value for the components.

15. A method according to claim 1, wherein one of the stations is a mobile station of a cellular communication system and at least one of the stations is a fixedly positioned base station, further comprising a step of determining the current geographical location of the mobile station by means of the distance between the mobile station and said at least one base station.

16. A method according to claim 15, further comprising step of:

determining at least-one further distance between the mobile station and at least one further base station; and combining the results of the at least two determinations for estimating the current geographical location of the mobile station.

17. A method according to claim 1, wherein one of the stations is a mobile station, comprising step of combining the result of the estimation of the distance between the mobile station and another station with at least one further result obtained from another determination relating to the location of the mobile station.

18. A method according to claim 1, comprising communicating information of at least one of the accomplished determinations to a location service node of the communication system.

19. A communication system comprising:

a transmitting station arranged to transmit one or more signal bursts over time slots in accordance with a timing structure of the communication system;

a receiving station configured to;

receive the one or more signal bursts, determine a first timing of a signal burst received at the receiving station, the first timing being associated with a first component of the received signal that meets a predefined condition, determine a second timing of the received signal burst for use in adjustment of the receiving station for receiving and/or transmitting further signal bursts, determine timing delay information for communication between the stations, and estimate a distance between the transmitting and receiving stations based on the timing delay information and information about the first timing.

20. A communication system according to claim 19, wherein the receiving station is configured to determine a difference between the first timing and the second timing and is correct an initial estimate of the distance between the stations on the basis of the determined difference.

21. A communication system according to claim 19, wherein the receiving station is configured to base the distance estimation on a timing advance value derived from the timing delay information, to determine a difference between the first timing and the second timing, and to subtract the difference between the first timing and the second timing from the timing advance value.

22. A communication system according to claim 19, wherein the receiving station is configured to make use of an impulse response of the received signal burst.

23. A communication system according to claim 22, wherein the determination of the second timing is based on the mass center of the impulse response and the determination of the first timing is based on a first component of the signal to arrive.

24. A communication system according to claim 19, wherein the receiving station is configured to use different timings for reception and transmission.

25. A communication system according to claim 19, wherein the receiving station comprises a mobile station of a cellular communication system and the transmitting station comprises a base station of the cellular communication system.

26. A communication system according to claim 19, wherein the receiving station comprises a base station of a cellular communication system and the transmitting station comprises a mobile station of the cellular communication system.

27. A communication system according to claim 19, wherein one of the stations is a mobile station of a cellular communication system and at least one other of the stations is a fixedly positioned base station, the system configured to determine the current geographical location of the mobile station by means of the distance between the mobile station and said at least one base station.

28. A communication system according to claim 19, comprising further a location service node for providing geographical location information.

29. A communication system comprising:
a transmitting station comprising means for transmitting one or more signal bursts over time slots in accordance with a timing structure of the communication system;
a receiving station comprising:
means for receiving the one or more signal bursts;
control means for determining a first timing of a signal burst received at the receiving station, the first timing being associated with a first component of the received signal that meets a predefined condition;
control means for determining a second timing of the received signal burst for use in adjustment of the receiving station for receiving and/or transmitting further signal bursts;
control means for determining timing delay information for communication between the stations; and
control means for estimating a distance between the transmitting and receiving stations based on the timing delay information and information about the first timing.

30. A station in a communication station comprising a processing unit configured to:
determine a first timing of a received signal burst received from a transmitting station at the station, the first timing being associated with a first component of the received signal burst that meets a predefined condition, determine a second timing of the received signal burst, said second timing being for use in adjustment of internal timing of the station for communicating further signal bursts with the transmitting station, determine timing delay information for the communication between the transmitting station and the station, and estimate a distance between the transmitting station and the station based on said timing delay information and information about the first timing of the received signal burst.

31. A station in a communications system comprising
means for determining a first timing of a received signal burst received from a transmitting station at the station, the first timing being associated with a first component of the received signal burst that meets a predefined condition;
means for determining a second timing of the received signal burst, said second timing being for use in adjustment of internal timing of the station for communicating further signal bursts with the transmitting station;
means for determining timing delay information for the communication between the transmitting station and the station; and
means for estimating a distance between the transmitting station and the station based on said timing delay information and information about the first timing of the received signal burst.

32. A method comprising:
receiving at a first station a signal burst transmitted from a second station;
determining first timing information associated with the signal burst;
determining second timing information associated with the signal burst;
determining timing delay information associated said second timing of the signal burst; and
estimating a distance between the first and second stations based on said timing delay information and said first and second timing information.

33. The method if claim 32 comprising calculating a difference between said first and second timing information, wherein said estimating uses said difference.

34. A computer-readable medium having computer-executable components for:
determining a first timing of a received signal burst received from a transmitting station at a receiving station, the first timing being associated with a first component of the received signal burst that meets a predefined condition;
determining a second timing of the received signal burst, said second timing being for use in adjustment of internal timing of the receiving station for communicating further signal bursts with the transmitting station;
determining timing delay information for the communication between the transmitting and receiving stations; and
estimating a distance between the transmitting and receiving stations based on said timing delay information and information about the first timing of the received signal burst.

35. A computer-readable medium having computer-executable components for:
receiving at a first station a signal burst transmitted from a second station;
determining first timing information associated with the signal burst;
determining second timing information associated with the signal burst;
determining timing delay information associated said second timing of the signal burst; and
estimating a distance between the first and second stations based on said timing delay information and said first and second timing information.

* * * * *